United States Patent [19]  
Melzig

[11] Patent Number: 4,959,471  
[45] Date of Patent: Sep. 25, 1990

[54] PHOTOCHROME SPIROINDOLINE-OXAZINES

[75] Inventor: Manfred Melzig, Wessling, Fed. Rep. of Germany

[73] Assignee: Optische Werke G. Rodenstock, Munich, Fed. Rep. of Germany

[21] Appl. No.: 345,840

[22] Filed: May 1, 1989

[30] Foreign Application Priority Data

Apr. 29, 1988 [DE] Fed. Rep. of Germany ....... 3814631

[51] Int. Cl.$^5$ .......................................... C07D 498/10
[52] U.S. Cl. .................................................... 544/71
[58] Field of Search ......................................... 544/71

[56] References Cited

U.S. PATENT DOCUMENTS 4,634,767  1/1987  Hoelscher et al. ................... 544/71

Primary Examiner—Richard L. Raymond  
Attorney, Agent, or Firm—Antonelli, Terry, Stout & Kraus

[57] ABSTRACT

Disclosed is a photochrome compound having a spirooxazine structure in a, as such known manner.

In accordance with the present invention conjugated diazole-napthoxazine or oxazole-, thiazole, benzoxazole-or benzthiazole systems are added to the basic structure.

Improved absorption in the wavelength range a than 350 nm as well as improved migration properties are yielded by this means.

13 Claims, No Drawings

PHOTOCHROME SPIROINDOLINE-OXAZINES

The present invention relates to photochrome compounds, i.e. substances whose absorption properties change in accordance with the ambient light in such a manner that the intensity and color impression of the tinting of the materials colored with such substances changes in accordance to the ambient light.

There are many possible applications of photochrome substances, by way of illustration in manufacturing photochrome sun protection ophthalmic lenses made of plastic, in manufacturing spectacle frames, etc.

Photochrome substances are, by way of illustration, known from U.S. Pat. Nos. 3,562,172, 3,578,602, 4,215,010, DE OS No. 29 36 255, WO No. 85/02619 or WO No. 87/00524.

With regard to the properties and, in particular, the disadvantages of the prior art photochrome substances in the aforementioned publications with the exception of the photochrome substances known from WO No. 85/00524, reference is made to the detailed discussion in the introductory part of the description of WO No. 87/00524. Moreover, said publicaton is expressly referred to concerning all terms not made more apparent herein.

The phototropic substances known from WO No. 87/00524 have the advantage that the molecules only have comparatively negligible migration properties, particularly, if deposited in plastic materials and that the impression of the color is not "as intensely blue" as is the case with substances known from the other cited publications.

However, it has turned out that it would even be desirable to further improve the migration properties, the color impression and the longevity of the substances known from WO No. 87/00524.

The object of the present invention is to provide phototropic compounds which, by way of illustration, are suited for tinting ophthalmic lenses made of plastic material and whose migration properties, color impression and longevity is further improved.

A solution to the foregoing object and its further embodiments is set forth in the claims hereto.

The invented compounds according to the general equation defined in claim 1 hereto, strikingly, have a number of advantages:

The wide spreading molecular structure prevents the migration of the molecules in the plastic materials, which is especially important if the materials are exposed to higher temperature as, by way of illustration, is the case in vaporizing processes for applying unreflecting layers or even with motor vehicle glove compartments.

Conjugated (aromatic substance) diazole naphthoxazine or the corresponding oxaxole, thiazole, benzoxazole and benzthiazole system yields very intensive absorpton in the wavelength range larger than 350 nm and thus high sensitivity to sunlight. The diazole or oxazole, thiazole, benzoxazole and benzthiazole ring in the 5'-, 6'-, 8'- or 9'- position yields, in comparison to the otherwise same structured molecules not substitued in these positions, a shifting of the maximum absorption by approximately 20 to 40 nm towards the longer wavelength by means of which the cosmetically more favorable greenish tinting can be produced, which is, particularly, of major significance when the invented substances are utilized in sun protection lenses or tinted ophthalmic lenses.

Compared to otherwise same structured, by way of illustration, —COOCH$_3$, —COOC$_6$H$_5$, —CONHC$_6$H$_5$ molecules substituted in the 5' position or 8' position, the compounds of the invention have many times greater longevity.

Futhermore, the invented compounds, however, possess the same advantages, in particular, with regard to temperature dependency of the phototropic effect as the compounds described in WO No. 87/00524.

The present invention is made more apparent in the following using preferred embodiments.

In the following section, the production of two compounds according to the present invention will be explained in detail. Moreover, the data of further compounds, which can be produced analogously, are presented. Naturally, it goes without saying that the decribed compounds may also be produced in another manner or that the described process may also be used to produce other compounds in accordance with the present invention corresponding to the overall main claim:

EXAMPLE 1

7.9 g (55 mMol) acetimidic acid ethylester hydrochloride and 10 g (50 mMol) 3-hydroxy-naphthalene-2-carboxylic-acidhydrazide are stirred in 100 ml 1-methyl-2-pyrrolidone for 1 h at 125°-128° C. After cooling off, the reaction mixture is poured into 500 ml of ice water. The precipitate is filtered off and washed with water and subsequently dried in a vacuum.

The product is suspended in 75 ml of glacial acetic acid into which 18.6 g of NaNO$_2$ are dripped as a concentrated aqueous solution at 5°-10° C. After 3 h stirring at 10° C., the mixture is added to 200 ml ice water. The orange precipitate is filtered off, washed with water and dried in a vacuum at 60° C.

9 g of the nitroso product are boiled with 9 g 1,3,3-trimethyl-2-methylene indoline in 300 ml ethanole with an addition of 2 ml piperidine for 3 h under backflow. After removing the solvent, the reaction mixture is chromatographed over Al$_2$O$_3$ with methylene chloride. Following the removal of the elution solvent, 5'-(5'-methyl-2-oxadiazolyl)-1,3,3-trimethylspiro(indoline-2,3'-3H-naphth(2,1-b)(1,4)oxazine) remains in the form of a light yellow powder with a melting point of 169° C.

The compound produced in this manner has the following NMR data:

1H-MR(CDCl$_3$): 1.37; s; 6H 3,3-(CH$_3$)$_2$ 2,16; s; 3H oxadiazolyle-CH$_3$ (R$_7$) 2,66; s; 3H N—CH$_3$ 7,77; s; 1H 2'—H 8,40; s; 1H 6'—H 8,53; m; 1H 10'—H The same product can also be obtained by the following method:

18 g P$_2$O$_5$ and 10 g H$_3$PO$_4$ are raised to 80° C. under exclusion of moisture. 2 g (10 mmol) 3-hydroxy-naphthaline-2-carboxylic-acid-hydrazide and 0.6 g (10 mmol) acetic acid are added and stirred for 4 h at 80° C. After cooling to 60° C., the mixture is poured into ice water. The filtered off precipitate is washed with water and dried. Nitrosation and reaction with indoline base ensue as described hereinbefore.

Further examples of compounds according to the present invention yielded by means of analgous methods are presented in the following:

EXAMPLE 2

5'-(5'-phenyl-2-oxadiazolyl-1,3,3-trimethylspiro(indolino-2,3'-3H-naphth(2,1-b)(1,4)oxazine)

benzoic acid 1,3,3-trimethyl-2-methylene-indoline mp: 188° C.

$^1$H-NMR (CDCl$_3$): 1,37; s; 6H; 3,3-(CH$_3$)$_2$ 2,71; s; 3H; N—CH 7,71; s; 1H; 2'—H 8,29; s; 1H: 6'—H 8,45; m; 1H; 10'—H

EXAMPLE 3

5-amino-5'-(5'-phenyl-2-oxadiazolyl)-1,3,3-trimethylspiro(indoline-2,3'-3H-naphth(2,1-b)(1,4)oxazine)

benzoic acid 5-amino-1,3,3-trimethyl-2-methylene-indoline mp: 152° C.(Z.)

$^1$H—NMR (CDCl$_3$): 1,32; s; 6H; 3,3-(CH$_3$)$_2$ 2,62; s; 3H; N—CH$_3$ 3,12; br; 2H; NH$_2$ 6,43; s; 1H; 4—H 7,69; s; 1H; 2'—H

EXAMPLE 4

5'-(5-phenyl-2-oxadiazolyl)-5-methoxy-1,3,3-trimethylspiro (indoline-2,3'-3H-naphth(2,1-b)(1,4)oxazine)

benzoic acid 5-methoxy-1,3,3-trimethyl-2-methylene-indoline mp: 219° C.

$^1$H—NMR (CDCl$_3$): 1,32; s; 6H; 3,3-(CH$_3$)$_2$ 2,60; s; 3H; N-CH$_3$ 3,78; s; 3H; 5—OCH$_3$ 7,67; s; 1H; 2'—H 8,33; s; 1H; 6'—H

EXAMPLE 5

5'-(5-phenyl-2-oxadiazolyl)-1,3,3,5,6-pentamethylspiro(indoline-2,3'-3-naphth(2,1-b)(1,4)oxazine)

benzoic acid 1,3,3,5,6-pentamethyl-2-methylene-indoline mp: 224° C.–226° C.

$^1$H—NMR (CDCl$_3$): 1,33; s; 6H; 3,3—(CH$_3$)$_2$ 2,21; s; 3H; 5—CH$_3$ 2,26; s; 3H; 6—CH$_3$ 2,64; s; 3H; N—CH$_3$ 6,88; s; 1H; 7—H 7,65; s; 1H; 2'—H 8,31; s; 1H; 6'—H

EXAMPLE 6

$^1$H—NMR (DMSO): 0,83; t; 3H 3-ethyl 1,34; s; 6H 3—CH$_3$ 1,60; q; 2H; 3—ethyl 2,70; s; 3H; N—CH$_3$ 7,70; s; 1H; 2'—H 8,42; s; 1H; 6'—H 11,4; br,s; 1H; OH

EXAMPLE 7

5-amino-5'-(5-(2-hydroxyphenyl)-2-oxadiazolyl)-1-isopropyl-3,3-dimethylspiro (indoline-2,3'-3H-naphth(2,1-b)(1,4) oxazine)

salicylic acid 5-amino-1-isopropyl-3,3-dimethyl-2-methlyene-indoline mp: 146° C. (Z.)

$^1$H—NMR (DMSO): 1,35; s; 6H; 3,3—(CH$_3$)$_2$ 1,42; d; 6H; 1-isopropyl 3,66; m; 1H; 1-isopropyl 3,84; br; 2H; NH$_2$ 6,47; s; 1H; 4—H 7,63; s; 1H; 2'—H 8,42; s; 1H; 6'—H 11,0; br, s; 1H; OH

EXAMPLE 8

5'-(5-methyl-2-oxadiazolyl)-5,6-dimethyoxy-1,3,3-trimethylspiro(indoline-2,3'-3H-naphth(2,1-b) (1,4)oxazine)

acetic acid 5,6-dimethyloxy-1,3,3-trimethyl-2-methylene-indoline mp: 196° C.

$^1$H—NMR (CDCl$_3$): 1,33; s;.6H; 3,3-CH$_3$)$_2$ 2,19; s; 3H; oxadiazolyl—CH$_3$ 2,62; s; 3H; N—CH$_3$ 3,78; s; 6H; 5,6—CH$_3$ 6,61; s; 1H; 7—H 7,62; s; 1H; 2'—H 8,34; s; 1H; 6'—H The following examples can, by way of illustration, be produced by means of the process described for example 9:

EXAMPLE 9

28.2 g of 2-hydroxy-3-naphthalene-carboxylic-acid and 21 g of o-amino-thiophenol are dissolved in 300 ml of boiling tovol. After cooling to 90° C., 13.1 ml of PCL$_3$ in 75 ml of toluene are dripped into it, whereby a yellow, flaky precipitate is deposited. The mixture is subsequently boiled for 2 h and after cooling to 60° C. poured into 600 ml of methanol. After a few minutes, the crystallization of the light yellow 2-hydroxy-3-(2-benzthiazolyl)-naphthalene commences. The cooled solution is filtered, the product is washed with methanol and dried in a vacuum at 60° C. (The yield is 18 g).

The nitrosation ensues in 72 g of glacial acetic acid at 5°–10° C. with 18 g of NaNO$_2$ in a concentrated aqueous solution. After 3 h the mixture is stirred at 5° C. and added to 200 ml of ice water. The precipitated light brown nitroso product is first washed with a little cold ethanol, then with ice-cold (0° C.) ether and dried.

The orange-yellow 3-(2-benthiazolyl)-2-hydroxy-1-nitrosonapththalene (Fp. 179° C.) yielded is practically quantative.

4 g of the nitroso compound is boiled with 4 g 1,3,3,-trimethyl-2-methlyene-indoline in 100 ml of absolute ethanol and 0.5 ml of piperidine for 2 h under backflow. The solvent is subsequently drawn off; the residue with CH$_2$CL$_2$ is chromatographed over Al$_2$O$_3$.

The green-blue zone is collected. After drawing off the solvent, 5'-(2-benzthiazolyl)-1,3,3-trimethylspiro (indoline-2,3'-3H-naphth(2,1-b)(1,4)oxazine) remains as a sand-colored powder with a melting point of 214° C.

The compound obtained by this menas has the following NMR data:

$^1$H—NMR (CDCl$_3$): 1,35; s; 6H; 3,3-(CH$_3$)$_2$ 2,64; s; 3H; —CH$_3$ 7,79; s; 1H; 2'—H 8,70; s; 1H; 6'—H

The compounds listed in the following section, whose melting points and $^1$H—NMR data are given, can be obtained with a method analgous to example 9 by means of the reaction of the 2-hydroxy-3-naphthalene-carboxylic-acid with the corresponding o-amino-hydroxy or o-amino-mercapto compounds, nitrosation of the product and subsequent reaction with the corresponding indoline bases.

EXAMPLE 10

5'-(2-benzoxazolyl)-1,3,3-trimethylspiro (indoline-2,3'-3H-naphth(2,1-b)(1,4)oxazine)

o-amino-phenol 1,3,3-trimethyl-2-methylene-indoline mp: 233° C.

$^1$H—NMR (CDCl$_3$): 1,33; s; 6H; 3,3-(CH$_3$)$_2$ 2,66; s; 3H; N—CH$_3$ 7,76; s; 1H; 2'—H 8,52; s; 1H; 6'—H

EXAMPLE 11

5-methyoxy-5'-(2-benzoxazolyl)-1,3,3-trimethylspiro (indoline-2,3'-3H-naphth (2,1-b) oxazine)

o-amino-phenol
5-methoxy-1,3,3-trimethyl-2-methylene-indoline mp: 157° C.

$^1$H—NMR (CDCl$_3$): 1,32; s; 6H; 3,3-(CH$_3$)$_2$ 2,64; s; 3H; N—CH$_3$ 3,70; s; 3H; O—CH$_3$ 7,74; s; 1H; 2'—H 8,50; s; 1H; 6'—H

EXAMPLE 12

5'-(2-benzoxazolyl)-1-ethyl-3,3,5,6-tetramethylspiro (indoline-2,3'-3H-naphth(2,1-b)(1,4)oxazine)

o-amino-phenol 1-ethyl-3,3,5,6-tetramethyl-2-methylene-indoline mp: 211° C.

$^1$H—NMR (CDCl$_3$): 1,28; s; 6H; 3,3-(CH$_3$)$_2$ 1,33; t; 3H; 1—ethyl 2,23; s; 3H; 5—CH$_3$ 2,30; s; 3H; 6—CH$_3$ 3,26; q; 2H; 1—ethyl 7,80; s; 1H; 2'—H 8,54; s; 1H; 6'—H

EXAMPLE 13

5'-(2-benzthiazolyl)-1,3,3,5,6-pentamethylspiro (indoline-2,3'-3H-naphth (2,1-b)(1,4)oxazine)

o-amino-thiophenol
1,3,3,5,6-pentamethyl-2-methylene-indoline mp: 193° C.

$^1$H—NMR (CDCl$_3$): 1,34; s; 6H; 3,3-(CH$_3$)$_2$ 2,21; s; 6H; 5,6—CH$_3$ 2,66; s; 3H; N—CH$_3$ 6,82; s; 1H; 7—H 6,98; s; 1H; 4—H 7,75; s; 1H; 2'—H 8,63; s; 1H; 6'—H

EXAMPLE 14

5-amino-5'-(2-benzthiazolyl)-1,3,3-trimethylspiro (indoline-2,3'-3H-naphth (2,1-b)(1,4) oxazine)

o-amino-thiophenol
5-amino-1,3,3,-trimethyl-2-methylene-indoline mp: 141° C. (Z.)

$^1$H—NMR (CDCl$_3$): 1,33; s; 6H; 3,3-(CH$_3$)$_2$ 2,64; s; 3H; N—CH$_3$ 3,20; br; 2H; NH$_2$ 6,43; s; 1H; 4—/6—H 7,79; s; 1H; 2'—H 8,59; s; 1H; 6'—H

The compounds according to the present invention have, i.a., the advantage that their color is shifted "toward green", compared to the known compounds, as is illustrated by the single FIGURE showing a comparison of the absorption at the boundary UV-/visible light between 9'-methoxy-1,3,3-trimethylspiro (indoline-2,3'-3H-naphth (2,1-b)(1-4) (1,4)oxazine), i.e. one of the compounds mentioned in U.S. Pat. No. 4,215,010 and 5'-(5-methyl-2-oxadiazolyl)-1,3,3-trimethylspiro (indoline-2,3'-3-H-naphth(2,1-b)(1,4) oxazine), i.e. example 1 of the present invention.

A further advantage is the increased longevity. In the following section a comparison is made of an also substituted in the 5'-position electron-attracting spironaphthoxazine 1,3,3-trimethylspiro(indoline-2,3'-3H-naphth(2,1-b)(1,4)oxazine-5'-methyl carboxylate and example 1 of the present invention:

Relative power (rel. p.) of a plastic ophthalmic lens tinted with a compound according to the present invention (in %).

| Xenon charge (h) | Example | State of the Art |
|---|---|---|
| 5 | 98.8 | 79.3 |
| 10 | 97.6 | 43.6 |
| 15 | 93.3 | 22.1 |
| 25 | 84.7 | 4.9 |
| 50 | 51.1 | — |
| 75 | 25.2 | — |

The relative power is defined by the quotient of the optical density difference (V-valued) between brightened and exposed state following x h xenon charge and the initial state:

$$100 * \frac{OD\,(\times\,h)}{OD\,(O\,H)} = \text{rel. p. (\%)}$$

The transmission according to V in a brightened state is measured ($_o$) after 1 h brightening at 80° C. and subsequent cooling to room temperature.

The transmission in adarkened state is measured ($_s$) at 23° C. after 15 minutes of exposure with 60 kux at an angle of 30°.

$$OD = {}^{10}\log{}_o - {}^{10}\log{}_s$$

The xenon charge was measured with a commercial exposure/weathering measuring device with 130 klux and 40° C. black board temperature.

In the preceding, the present invention has described, by way of illustration, using preferred embodiments. Naturally, there are many very varied possible modifications of the overall inventive concept set forth in the claims hereto.

Moreover, the compounds of the present invention can be used for any desired purpose. Of particular advantage is, however, if they are utilized in plastic ophthalmic lenses into which they can be introduced in the as such known manner. Reference is made only by of example to DE-OS No. 35 16 568 as various possible ways of introduction.

What I claim is:

1. A photochrome compound defined by the following general equation

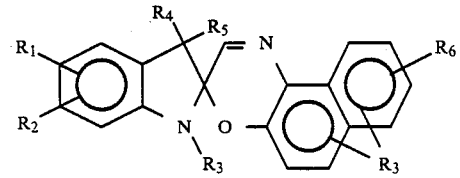

wherein R$_1$, R$_2$, =—CN, —CF$_3$, —Y, OY, —NY$_2$ Y=H, alkyl residue with up to 8 C-atoms, aryl or heteroaryl residue;

R$_3$, R$_4$, R$_5$=—CH$_3$, —C$_2$H$_5$, —C$_3$H$_7$, —phenyl, —benzyl, —pyridyl or R$_4$ and R$_5$ may close to form a C$_5$-C$_7$ cycloalkane ring R$_6$=—Y, OY, —CN, —NO$_2$, —Cl, or —Br 1

R$_7$=—H, —CH$_3$, —C$_2$H$_5$, —phenyl, —benzyl, —pyridyl, or -naphth(2)yl or -phenyl, -benzyl, -pyridyl, or -naphth(2)yl substituted by -OH in the ortho position; and R$_8$ is an oxadiazole

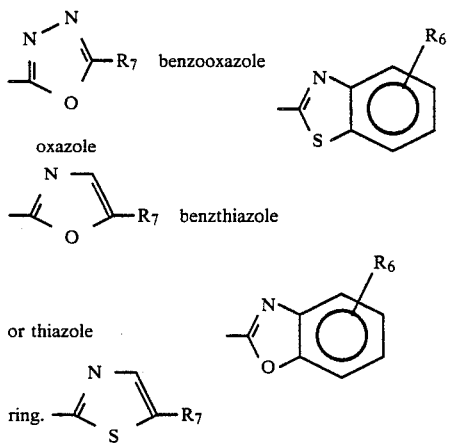

2. A compound according to claim 1, wherein $R_8$ stands as a substituent in the 5'-, 6'-, 8'- or 9'-position.

3. A compound according to claim 1 or 2, wherein the oxadiazole ring stands in the 5'- position in the naphthoxazine system and $R_7$ is —$CH_3$.

4. A compound according to claim 1 or 2, wherein the oxadiazole ring stands in the 5'-position in the naphthoxazine system and $R_6$ is 6'-OH.

5. A compound according to claim 1 or 2, wherein $R_8$ stands as a substituent in the 8'- or 9'-position and $R_6$ is 9'-OH or 8'-OH.

6. A compound according to claim 1 or 2, wherein $R_7$ is —phenyl, —benzyl, —pyridyl or —naphth(2)yl substituted by —OH in the ortho position.

7. A compound according to claim 1 or 2, wherein $R_4$ and $R_5$ close to form a $C_5$-$C_7$ cycloalkane ring.

8. A compound according to claim 1, wherein the oxadiazole ring stands in the 5'-position in the naphthoxazine system, $R_6$ is 6'—OH and $R_7$ is —phenyl, —benzyl, —pyridyl or —naphth(2)yl substituted by —OH in the ortho position.

9. A compound according to claim 1, wherein $R_6$ is 9'—OH or 8'—OH, $R_7$ is —phenyl, —benzyl, —pyridyl or —naphth(2)yl substituted by —OH in the ortho position and $R_8$ stands as a substituent in the 8'- or 9'-position.

10. A compound according to claim 1, wherein the oxadiazole ring stands in the 5'-position in the naphthoxazine system, $R_7$ is —$CH_3$ and $R_4$ and $R_5$ close to form a $C_5$-$C_7$ cycloalkane ring.

11. A compound according to claim 1, wherein the oxadiazole ring stands in the 5'-position in the naphthoxazine system, $R_6$ is 6'—OH and $R_4$ and $R_5$ close to form a $C_5$—$C_7$ cycloalkane ring.

12. A compound according to claim 1, wherein $R_4$ and $R_5$ close to form a $C_5$-$C_7$ cycloalkane ring and $R_8$ stands as a substituent in the 8'- or 9'-position and $R_6$ is 9'—OH or 8'—OH.

13. A compound according to claim 1, wherein $R_4$ and $R_5$ close to form a $C_5$-$C_7$ cycloalkane ring and $R_7$ is -phenyl, -benzyl, -pyridyl or -naphth(2)yl, substituted by —OH in the ortho position.

* * * * *